April 9, 1957 W. VEERSMA 2,788,035
PLANER CHIP BREAKER MICRO CONTROL
Filed July 22, 1955 2 Sheets-Sheet 1

INVENTOR
Walter Veersma
BY
Frank E. Liverance, Jr.
ATTORNEY

April 9, 1957

W. VEERSMA 2,788,035

PLANER CHIP BREAKER MICRO CONTROL

Filed July 22, 1955

2 Sheets-Sheet 2

INVENTOR
Walter Veersma
BY
Frank E. Liverance Jr.
ATTORNEY 2,788,035
Patented Apr. 9, 1957

2,788,035
PLANER CHIP BREAKER MICRO CONTROL

Walter Veersma, Holland, Mich., assignor to Buss Machine Works, Holland, Mich., a corporation of Michigan Application July 22, 1955, Serial No. 523,831

1 Claim. (Cl. 144—244)

This invention is directed to a novel, accurate and time saving control for adjustment of the chip breaker used in a wood planer. Such chip breaker, which is ordinarily between the upper infeed roll and the rotary cylindrical cutter of a wood planer, requires adjustment for a proper disposal and relation thereof to such cutter cylinder and the work which is passed through the infeed rollers under the chip breaker and thence to the cutter cylinder. Such adjustment has in general been previously done by using wrenches in connection with nuts and bolts or the like thereon for adjustment, which adjustment may be inaccurate because of discrepancies and mistakes with respect to uniformity of adjusting movement which the chip breaker should have which is an adjustment requiring close accuracy.

It is an object and purpose of the present invention to provide a chip breaker adjustment by simple, novel and practical mechanism, so that the adjustment of the chip breaker is certain, sure and uniform in its length, and is very quickly accomplished with accuracy and exactness.

Figure 1:
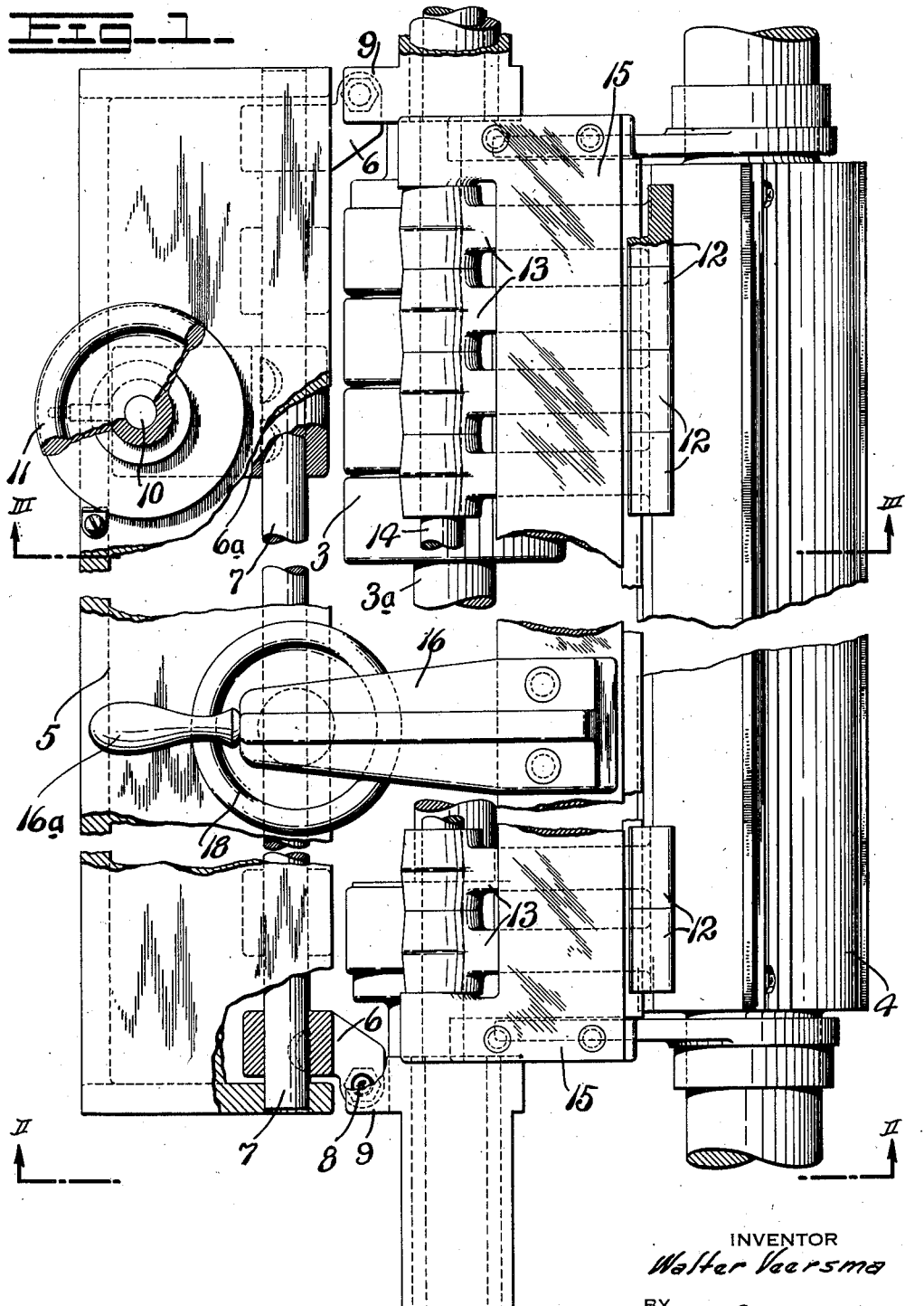

The invention may be understood from the following description taken in connection with the accompanying drawings, in which, Fig. 1 is a fragmentary plan view of the infeed end mechanism of a wood planer, parts being broken away and shown in section for better disclosure.

Figure 2:
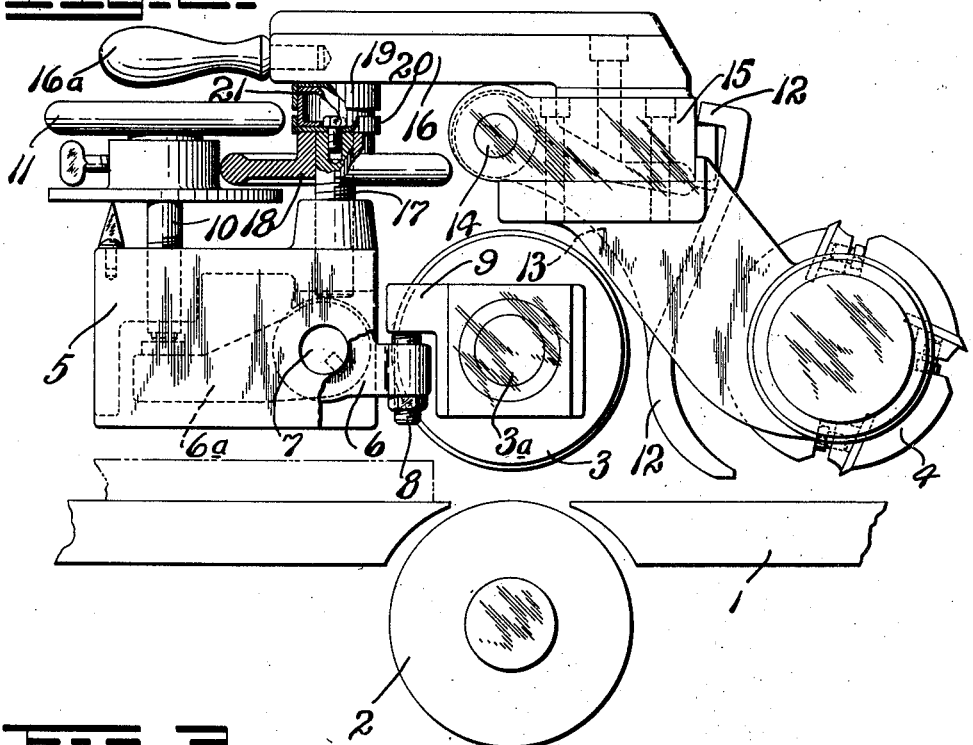
Figure 3:
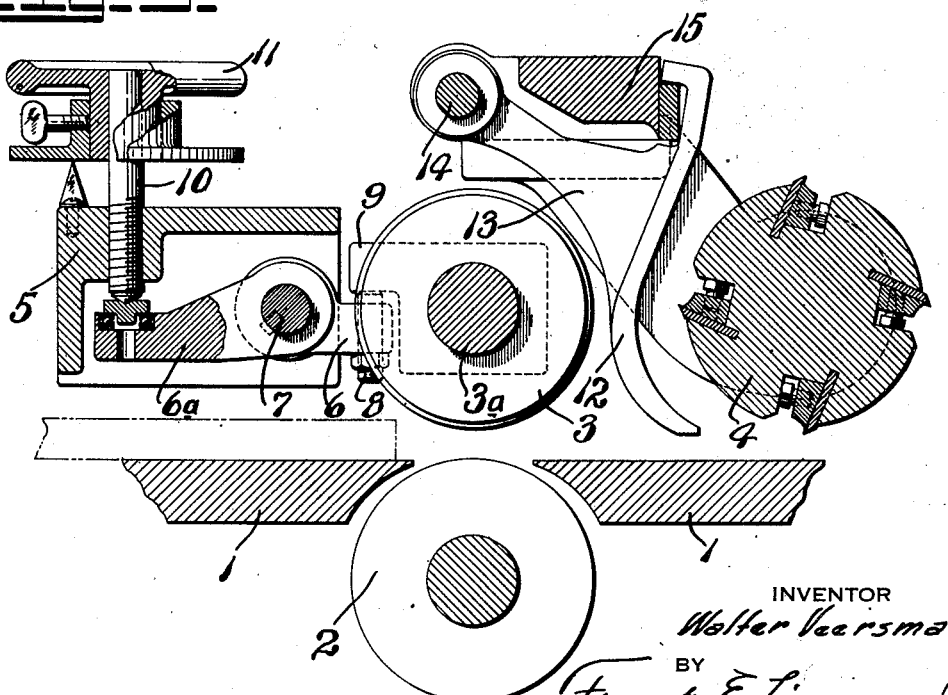

Fig. 2 is an end elevation of the structure shown in Fig. 1, such structure being viewed from the plane of line II—II, looking in the direction indicated, with some parts broken away and in section, and Fig. 3 is a transverse vertical section substantially on the plane of line III—III of Fig. 1 looking in the direction indicated.

Like reference characters refer to like parts in the different figures of the drawings.

The wood planer environment with which my invention is used includes a horizontal table 1 below which, between its ends, the horizontal lower infeed roller 2 is mounted. Above it and spaced from the lower roller 2 is an infeed roller 3, the shaft 3a of which is carried at its ends in journals slidably mounted on the machine frame for up and down movement. It is between the lower roller 2 and upper roller 3 that the boards shown in dash and dot line in Fig. 2 are entered, being fed thereby to the cutting cylinder 4 of the planer, which is also mounted to turn about a horizontal axis and carries a plurality of circumferentially spaced cutting knives, the cuting edges of which extend beyond the outer surface of the cutter cylinder as shown.

As disclosed in my Patent No. 2,664,124, granted December 29, 1953, the upper infeed roller 3 has an accurate and exact vertical adjustment, equal at both ends, of the shaft 3a, such adjustment being required for different thicknesses of work passing between the infeed rollers. A fixed horizontal beam 5 extends transversely between the sides of the frame of the planer. Two arms 6 are fixed to a rock shaft 7 mounted on the frame member 5 each extending rearwardly from such shaft 7 and having an adjusting screw 8 passing vertically therethrough, the upper end of which bears against the under side of a lug 9 extending over it. Lugs 9 are one on each of the journals carrying the shaft 3a of the upper infeed roller 3. An arm 6a secured to the shaft 7 extends in the opposite direction therefrom, against the upper side of which an adjusting screw 10 threaded downwardly through the frame member 5 bears, having an operating hand wheel 11 at its upper end. Such mechanism shown in my previously mentioned patent serves to lift or lower the infeed roller 3 simultaneously at both ends.

The chip breaker, preferably, consists of a plurality of sections 12 located in alignment transversely of the planer and disposed between the infeed roller 3 and the cutter cylinder 4. From each an arm 13 extends over the infeed roller, being mounted for rocking movement on a horizontal shaft 14 carried by a transverse bar 15. The upper ends of the chip breaker sections 12 each have a flange 12 extending over a projecting portion of the beam 15, which beam at each end thereof is likewise mounted for rocking movement upon the shaft 14 (Fig. 1). By raising and lowering the beam 15 there is a simultaneous upward or downward movement of the chip breaker sections 12.

A bar 16 is permanently secured at one end to and located above the beam 15. It extends horizontally over and at a distance above the transverse frame member 5 (Figs. 1 and 2). An adjusting screw 17 threads into the frame member 5 which is adapted to be operated by a hand wheel 18. Between the underside of the bar 16 and the upper end of the hub of the hand wheel 18 connections are provided including an upper inverted sheet metal cup member 19 and a lower sheet metal cup member 20 secured, respectively, to the bar 16 and the upper end of the screw 17 with a generally cylindrical spacer 21 between the members 19 and 20. A handle 16a extends from the free end of the bar 16. It is apparent that by manually operating the hand wheel 18, bar 16 may be raised or lowered with a simultaneous change of position of the chip breaker sections 12, such adjustment being uniform and equal for each of the sections 12 and very quickly obtained. Accuracy and uniformity of chip breaker adjustment in a time much less than previously needed is done in a very simple, effective and practical manner.

The invention is defined in the appended claim and is to be considered comprehensive of all forms of structure coming within its scope.

I claim:

In a planer having an upper rotatable infeed roller, a rotary cylindrical planer cutter spaced from said roller, and a fixed horizontal frame member between which and said cutter the infeed roller is located, the improvement comprising, a chip breaker between said roller and cutter, a horizontal bar from which said chip breaker is suspended, a shaft upon which said bar and chip breaker are mounted for rocking movements, a handle bar secured to said first mentioned bar extending over said frame member, and manually operable means between said frame member and handle bar for adjusting said handle bar toward or away from said fixed frame member comprising a vertical rod exteriorly threaded at its upper portion secured to and extending upwardly from said frame member directly under said handle bar, an interiorly threaded sleeve on said threaded upper end portion of said rod, means for manually turning said sleeve, and means between the upper end of said sleeve and the under side of said handle bar for moving the handle bar upwardly on upward movement of said sleeve.

References Cited in the file of this patent

UNITED STATES PATENTS

| | | |
|---|---|---|
| 677,243 | Luther | June 25, 1901 |
| 1,678,835 | Vivarttas | July 31, 1928 |
| 1,887,032 | Mann | Nov. 8, 1932 |
| 2,664,931 | Ballantine | Jan. 5, 1954 |